United States Patent
Shi et al.

(10) Patent No.: US 11,299,031 B2
(45) Date of Patent: Apr. 12, 2022

(54) WHEEL HUB MOTOR FOR ELECTRIC VEHICLE

(71) Applicant: Zhengqi Shi, Shandong (CN)

(72) Inventors: Liwei Shi, Shandong (CN); Zhen Han, Shandong (CN); Qingzhi Ma, Shandong (CN)

(73) Assignee: Shandong University of Technology, Zibo (CN)

( * ) Notice: Subject to any disclaimer, the term of this patent is extended or adjusted under 35 U.S.C. 154(b) by 290 days.

(21) Appl. No.: 16/615,674

(22) PCT Filed: Aug. 14, 2018

(86) PCT No.: PCT/CN2018/100473
§ 371 (c)(1),
(2) Date: Nov. 21, 2019

(87) PCT Pub. No.: WO2019/080611
PCT Pub. Date: May 2, 2019

(65) Prior Publication Data
US 2020/0114752 A1    Apr. 16, 2020

(30) Foreign Application Priority Data
Oct. 23, 2017 (CN) .......................... 201710990027.3

(51) Int. Cl.
*B60K 7/00* (2006.01)
*B60T 1/06* (2006.01)
(Continued)

(52) U.S. Cl.
CPC ............ *B60K 7/0007* (2013.01); *B60T 1/065* (2013.01); *H02K 7/006* (2013.01); *H02K 7/085* (2013.01);
(Continued)

(58) Field of Classification Search
CPC .......... B60K 7/0007; B60K 2007/0092; B60T 1/065; H02K 7/006; H02K 7/085; H02K 7/102
See application file for complete search history.

(56) References Cited

U.S. PATENT DOCUMENTS 11,025,133 B2 * 6/2021 Goossens ............. H02K 7/1023
2003/0159866 A1 * 8/2003 Claypole ................... B60T 1/10
180/65.51
(Continued)

FOREIGN PATENT DOCUMENTS

CN    202206277 U    4/2012
CN    205195498 U    4/2016
(Continued)

OTHER PUBLICATIONS

International Search Report and Written Opinion dated Nov. 16, 2018; International Application No. PCT/CN2018/100473; International Filing Date: Aug. 14, 2018; 8 pages.
(Continued)

*Primary Examiner* — Erez Gurari
(74) *Attorney, Agent, or Firm* — Blank Rome LLP

(57) ABSTRACT

A wheel hub motor for an electric vehicle includes eight sector-shaped through holes uniformly distributed in the circumference of a disc brake fixed to a shaft, and magnetic conductive ribs made of a magnetic conductive material arranged between two through holes. A stator core consists of nine square-C-shaped sub stator cores, each sub stator core surrounds two sides of the disc brake (6) and is fixed to a vehicle frame, adjacent sub stator cores are different by 30 degrees in a circumferential direction, a concentrated armature winding is wound around a yoke part at the middle portion of the sub stator core. A permanent magnet is fixed to a surface of an inner side of each sub stator core towards
(Continued)

the disc brake, the brake caliper is fixed to the vehicle frame and is located at a position without the stator core in a circumferential direction.

3 Claims, 4 Drawing Sheets

(51) Int. Cl.
*H02K 7/00* (2006.01)
*H02K 7/08* (2006.01)
*H02K 7/102* (2006.01)

(52) U.S. Cl.
CPC ...... *H02K 7/102* (2013.01); *B60K 2007/0092* (2013.01)

(56) References Cited

U.S. PATENT DOCUMENTS

| 2013/0099554 A1* | 4/2013 | Lee ...................... B60K 7/0007 |
| | | 301/6.5 |
| 2017/0110933 A1* | 4/2017 | Michel .................... H02K 7/14 |
| 2018/0076701 A1* | 3/2018 | Hunter ................. H02K 1/2793 |
| 2018/0342917 A1* | 11/2018 | Hunter ................. H02K 1/2793 |

FOREIGN PATENT DOCUMENTS

| CN | 105720772 A | 6/2016 |
| CN | 106655560 A | 5/2017 |
| CN | 107618356 A | 1/2018 |
| EP | 1078438 B1 | 2/2007 |

OTHER PUBLICATIONS

English translation of International Search Report; International Application No. PCT/CN2018/100473; International Filing Date: Aug. 14, 2018. 2 pages.
English translation; China Published Application No. CN105720772; Publication Date: Jun. 29, 2016; 7 pages.
English translation; China Published Application No. CN106655560; Publication Date: May 10, 2017; 6 pages.
English translation; China Published Application No. CN107618356; Publication Date: Jan. 23, 2018; 8 pages.
English translation; China Published Application No. CN202206277; Publication Date: Apr. 25, 2012; 5 pages.
English translation; China Published Application No. CN205195498; Publication Date: Apr. 27, 2016; 5 pages.
English translation; China Published Application No. EP1078438; Publication Date: Feb. 28, 2007; 9 pages.

* cited by examiner

WHEEL HUB MOTOR FOR ELECTRIC VEHICLE

RELATED APPLICATIONS

This application is a U.S. national phase application of International Application No. PCT/CN2018/100473, filed Aug. 14, 2018; which application claims benefit of priority of China Patent Application No. 201710990027.3, filed Oct. 23, 2017, entitled "WHEEL HUB MOTOR FOR ELECTRIC VEHICLE". Each of the above-identified related applications are incorporated herein by reference in their entirety.

FIELD OF USE

The present invention provides a wheel hub motor for an electric vehicle, and belongs to the technical field of electric vehicles.

BACKGROUND OF THE INVENTION

Development and popularization of "zero emission" electric vehicles becomes a research and development focus of each country to sustainable development of the automobile industry. A wheel hub drive system as a special drive manner of the electric vehicle has the advantages of high transmission efficiency, simple structure and the like, and is a new development trend of an automobile drive system. Therefore, it is very necessary to develop a low-cost and simple-structure wheel hub motor for an electric vehicle.

Currently, it is reported that corporations of Bridgestone, Mitsubishi Motors, Toyota Motor and Honda Automobile take a wheel-hub-driven electric vehicle as the research and development target, and six different forms of sample vehicles has been trial produced so far. Chevrolet s-10 four-cylinder hybrid pickup developed by General Motors Company has two hub motors respectively mounted in two back wheels, and its generated torque is equal to a torque of a general V6 engine. Therefore, a wheel hub motor with high transmission efficiency has a wide application prospect.

A basic structure of the wheel hub motor for an electric vehicle in the prior art can refer to the following patents. An authorized patent with the application number of 201510713767.3 discloses a wheel hub motor driving device. The wheel hub motor driving device includes a supporting mechanism; a tyre mechanism is connected with the supporting mechanism; a stator mechanism is arranged at the edge of the tyre mechanism, and is connected with the supporting mechanism; a rotor mechanism is arranged in the stator mechanism, and is connected with the supporting mechanism; the rotor mechanism has a hollow structure; a brake is arranged in the hollow structure of the rotor mechanism; a transmission mechanism is connected with the rotor mechanism, and is connected with the tyre mechanism; and a suspension mechanism is connected with the supporting mechanism. The wheel hub motor driving device needs to mount a gear reduction unit with a constant velocity ratio on a side of the wheel to reduce vehicle speed and although coaxial speed reduction can be achieved, a lubrication speed reduction structure is hard to be achieved; and gear wear is quick, heat is hard to be dissipated, and unsprung mass is too large so as not to be applied to a micro electric vehicle. A patent with the application number of 201010205980.0 discloses a wheel hub motor brake device for an electric drive heavy vehicle, where one brake can achieve functions of service brake, emergency brake and parking brake, but the device still needs to be integrated with an outer rotor motor, and the patent is invalid.

An authorized patent with the application number of 201520365695.3 discloses a wheel hub motor driving system and a wheel hub motor drive axle, where a drive axle replaces components of an engine, a clutch, a gearbox, a transmission shaft, a differential and the like so as to simplify the whole mechanism and improve transmission efficiency. However, a motor of the patent is not changed, and the motor is still located outside the wheel after being mounted so as to cause increase of the unsprung mass of the automobile and increase of a mounting space, and to reduce the driving comfortableness.

SUMMARY OF THE INVENTION

Technical Problem

A wheel hub motor for an electric vehicle disclosed by the present invention is greatly different from the above applications in a motor body structure, where a motor and a wheel are integrated, a disc brake is utilized as an inner rotor, and it is unnecessary to mount a gear reduction unit with a constant velocity ratio on a side of the wheel to reduce vehicle speed, so unsprung mass and production costs can be further reduced.

To highly integrate a wheel and a drive motor, the present invention provides a wheel hub motor for an electric vehicle, which utilize a disc brake as a motor inner rotor to reduce unsprung mass and save space.

Technical Solution

Specific technical solutions adopted by the present invention are as follows:

a wheel hub motor for an electric vehicle includes a shaft, a hub, a stator core, armature windings, permanent magnets, a disc brake, a brake caliper and a bearing; where:

the hub is fixed to a tail end of the shaft, an inner side of the hub is provided with the disc brake fixed to the shaft, eight sector-shaped through holes are uniformly distributed in the circumference of the disc brake, and magnetic conductive ribs made of a magnetic conductive material are arranged between two through holes;

the stator core consists of nine square-C-shaped sub stator cores, each sub stator core surrounds two sides of the disc brake and is fixed to a vehicle frame, and adjacent sub stator cores are different by 30 degrees in a circumferential direction;

a permanent magnet is fixed to a surface of an inner side of each sub stator core towards the disc brake, and a magnetization direction of each permanent magnet is the same; an end face of the permanent magnet is sector-shaped; the sector-shaped end face of the permanent magnet and the sector-shaped through hole of the disc brake are aligned in a radial direction; a concentrated armature winding is wound around a yoke part at the middle portion of each sub stator core, the armature winding is located between an armature pole and the permanent magnet, and winding directions of two armature coils in the same armature winding are opposite; and winding directions of the armature coils of adjacent armature windings are opposite; and the brake caliper is fixed to the vehicle frame and is located at a position without the stator core in a circumferential direction, and friction plates on inner sides of the brake caliper are located on two sides of the disc brake.

According to the wheel hub motor for an electric vehicle, the external diameter of a sector of the sector-shaped through hole of the disc brake is greater than the external diameter of a sector of the sector-shaped end face of the armature pole, and the internal diameter of the sector of the sector-shaped through hole of the disc brake is less than the internal diameter of the sector of the sector-shaped end face of the armature pole.

A wheel hub motor for an electric vehicle includes a shaft, a hub, a stator core, armature windings, permanent magnets, a disc brake, a brake caliper and a bearing; where:

the disc brake fixed to the shaft is located on an inner side of the hub, nine sector-shaped through holes are uniformly distributed in the circumference of the disc brake, and a connection portion between two through holes is made of a magnetic conductive material;

the shaft is mounted on a vehicle frame through the bearing and can drive the hub to rotate;

the stator core consists of eight square-C-shaped sub stator cores, each sub stator core surrounds two sides of the disc brake and is fixed to the vehicle frame, and adjacent sub stator cores are different by 30 degrees in a circumferential direction;

a permanent magnet is embedded in a yoke part at the middle portion of each sub stator core, and a magnetization direction of each permanent magnet is the same;

each sub stator core has a pair of armature poles extending towards an inner side, and one surface of each armature pole towards the disc brake is sector-shaped;

a concentrated armature winding is wound around a yoke part at the middle portion of each pair of the sub stator cores, and winding directions of all armature coils are the same; and the brake caliper is fixed to the vehicle frame and is located at a position without the stator core in a circumferential direction, friction plates on inner sides of the brake caliper are located on two sides of the disc brake, and the disc brake is also utilized as a rotor of the motor and a braking round disc.

Beneficial Effects

The beneficial effects of the present invention are as follows:

(1) it is unnecessary to use a gear reduction unit or a motor brake device to reduce vehicle speed and unsprung mass, and heat dissipation during braking is easy to be achieved;

(2) the disc brake and the magnetic conductive ribs are integrated to be a motor inner rotor to highly integrate the wheel and the motor, so a greater space can be saved;

(3) exciting windings (the permanent magnets) and the armature windings are easy to dissipate heat so as to be applicable to high-temperature operating environment;

(4) each phase of the winding is completely isolated, and the exciting windings (the permanent magnets) and the armature windings are isolated such that short-circuit current does not cause fault propagation and reliability is improved; and (5) a rotor core only has one rotating disc with the through holes such that the weight and rotational inertia are small and response is quick.

DETAILED DESCRIPTION OF THE ILLUSTRATED EMBODIMENTS

Figure 1:
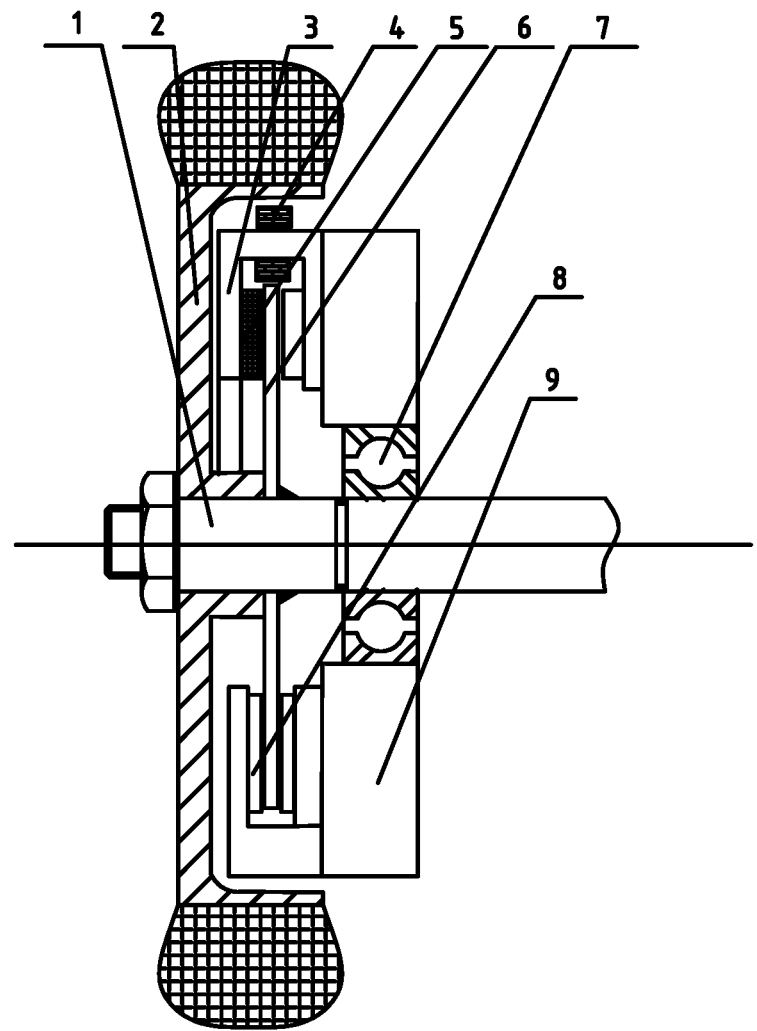
FIG. 1 is a schematic structural diagram of Embodiment 1 of a wheel hub motor for an electric vehicle of the present invention. In the drawing: 1—shaft, 2—hub, 3—stator core, 4—armature winding, 5—permanent magnet, 6—disc brake, 7—bearing, 8—brake caliper and 9—vehicle frame.

FIG. 1 is a schematic structural diagram of Embodiment 1 of a wheel hub motor for an electric vehicle. The wheel hub motor for an electric vehicle includes a shaft, a hub, a stator core, armature windings, permanent magnets, a disc brake, a brake caliper and a bearing; the hub is fixed to a tail end of the shaft, an inner side of the hub is provided with the disc brake fixed to the shaft, and a vehicle frame is connected with the shaft through the bearing.

Figure 2:
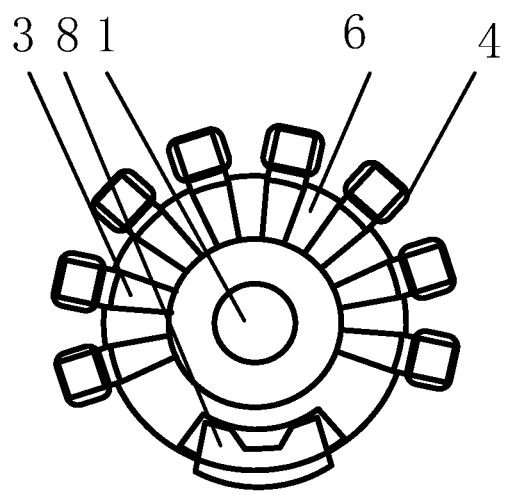
FIG. 2 is a side view of Embodiment 1 of a wheel hub motor for an electric vehicle of the present invention. In the drawing: 1—shaft, 3—stator core, 4—armature winding, 6—disc brake and 8—brake caliper.

FIG. 2 is a side view of Embodiment 1 of a wheel hub motor for an electric vehicle, including a stator core, armature windings, a disc brake and a brake caliper, the stator core consists of nine square-C-shaped sub stator cores, each sub stator core surrounds two sides of the disc brake and is fixed to a vehicle frame, and adjacent sub stator cores are different by 30 degrees in a circumferential direction.

A concentrated armature winding is wound around a yoke part at the middle portion of each sub stator core, the armature winding is located between an armature pole and the permanent magnet, and winding directions of two armature coils in the same armature winding are opposite; and winding directions of the armature coils of adjacent armature windings are opposite; and the brake caliper is fixed to the vehicle frame and is located at a position without the stator core in a circumferential direction, and friction plates on inner sides of the brake caliper are located on two sides of the disc brake.

Figure 3:
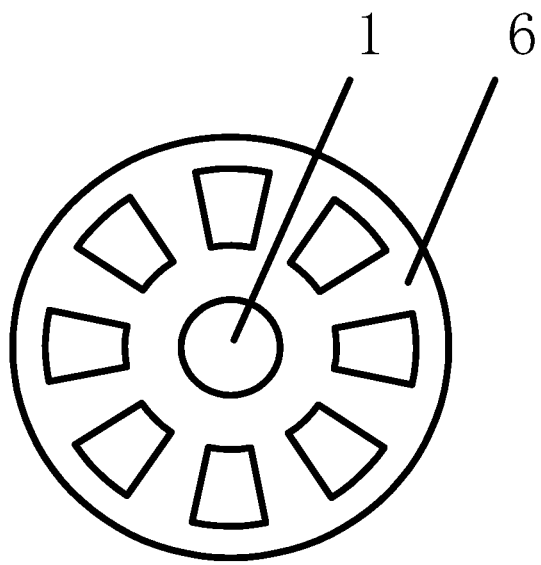
FIG. 3 is a side view of a disc brake in Embodiment 1 of a wheel hub motor for an electric vehicle of the present invention. In the drawing: 1-shaft and 6-disc brake.

FIG. 3 is a side view of a disc brake in Embodiment 1 of a wheel hub motor for an electric vehicle, including a shaft and a disc brake, eight sector-shaped through holes are uniformly distributed in the circumference of the disc brake, and magnetic conductive ribs made of a magnetic conductive material are arranged between two through holes. The external diameter of a sector of the sector-shaped through hole of the disc brake is greater than the external diameter of a sector of an end face of the armature pole, and the internal diameter of the sector of the sector-shaped through hole of the disc brake is less than the internal diameter of the sector of the end face of the armature pole.

Figure 4:
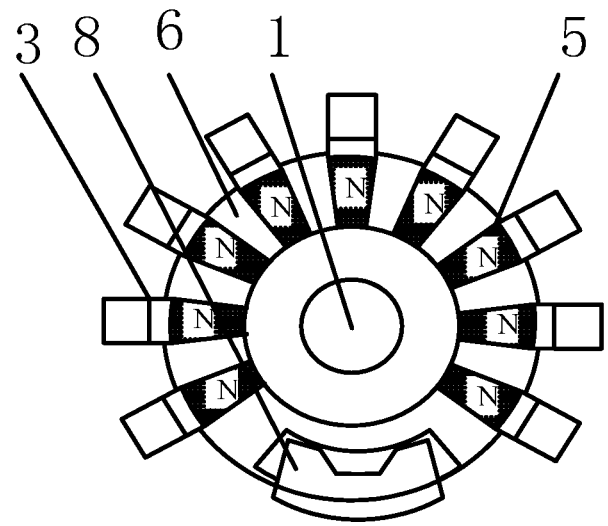
FIG. 4 is a schematic diagram of a permanent magnet in Embodiment 1 of a wheel hub motor for an electric vehicle of the present invention. In the drawing: 1—shaft, 3—stator core, 5—permanent magnet, 6—disc brake, and 8—brake caliper.

FIG. 4 is a side view of a permanent magnet in Embodiment 1 of a wheel hub motor for an electric vehicle. A permanent magnet is fixed to a surface of an inner side of each sub stator core towards a disc brake, and a magnetization direction of each permanent magnet is the same; an end face of the permanent magnet is sector-shaped; and the sector-shaped end face of the permanent magnet and the sector-shaped through hole of the disc brake are aligned in a radial direction.

Figure 5:
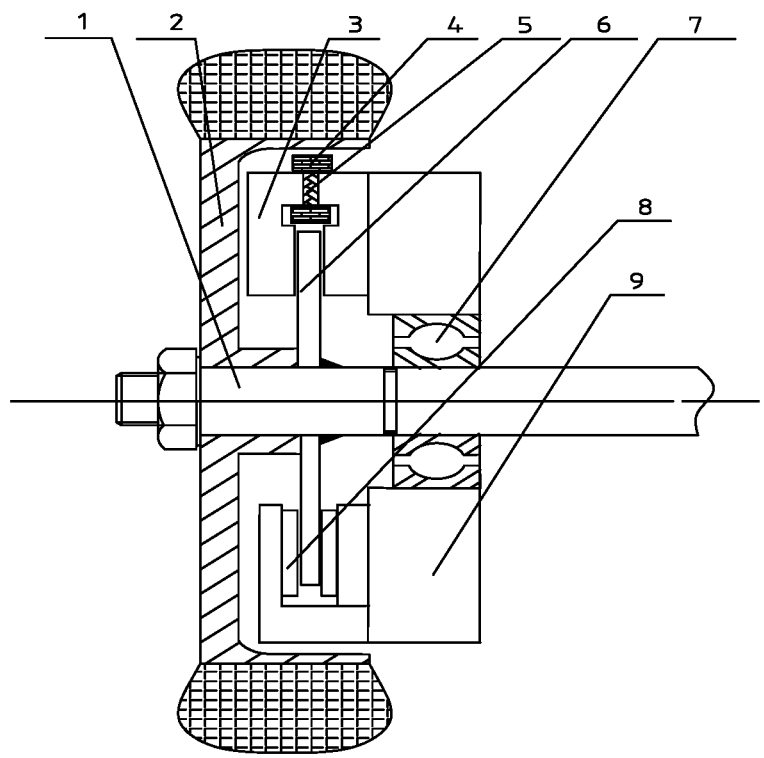
FIG. 5 is a schematic structural diagram of Embodiment 2 of a wheel hub motor for an electric vehicle of the present invention. In the drawing: 1—shaft, 2—hub, 3—stator core, 4—armature winding, 5—permanent magnet, 6—disc brake, 7—bearing, 8—brake caliper and 9—vehicle frame.

FIG. 5 is a schematic structural diagram of Embodiment 2 of a wheel hub motor for an electric vehicle, including a shaft, a hub, a stator core, armature windings, permanent magnets, a disc brake, a brake caliper and a bearing; the disc brake fixed to the shaft is located on an inner side of the hub while nine sector-shaped through holes are uniformly distributed in the circumference, and a connection portion between two through holes is made of a magnetic conductive material; the shaft is mounted on a vehicle frame through the bearing and can drive the hub to rotate; the stator core consists of eight square-C-shaped sub stator cores, each sub stator core surrounds two sides of the disc brake and is fixed to the vehicle frame, and adjacent sub stator cores are different by 30 degrees in a circumferential direction; a permanent magnet is embedded in a yoke part at the middle portion of each sub stator core, and a magnetization direction of each permanent magnet is the same; each sub stator core has a pair of armature poles extending towards an inner side, and one surface of each armature pole towards the disc brake is sector-shaped; and a concentrated armature winding is wound around the yoke part at the middle portion of each pair of the sub stator cores, and winding directions of all armature coils are the same.

Figure 6:
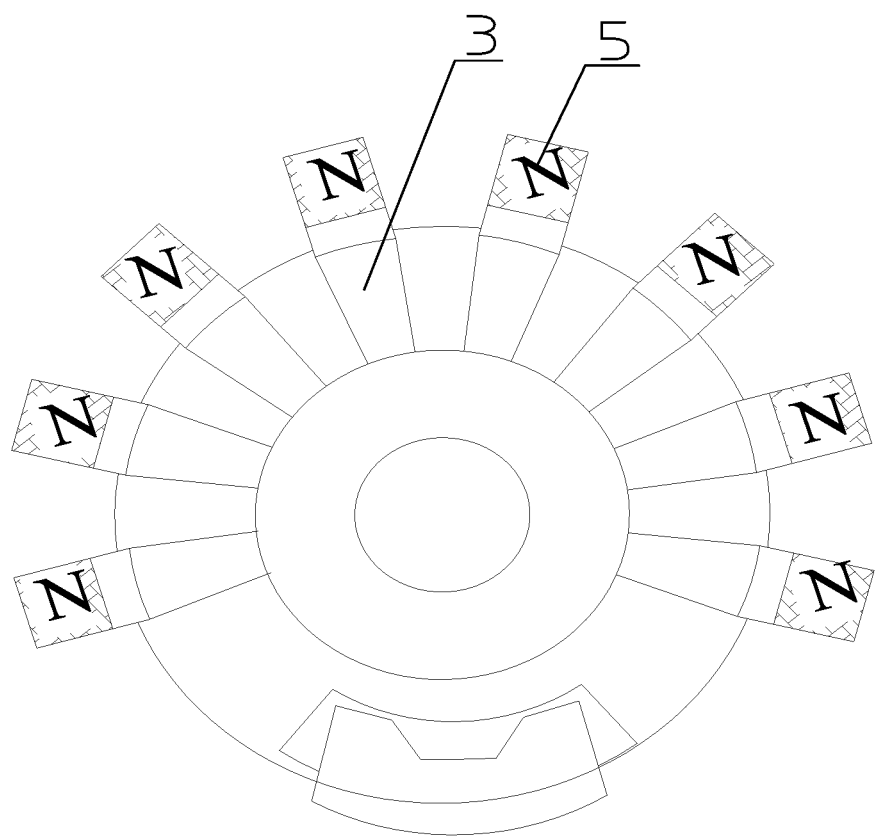
FIG. 6 is a schematic diagram of a permanent magnet in Embodiment 2 of a wheel hub motor for an electric vehicle of the present invention. In the drawing: 3—stator core and 5—permanent magnet.

FIG. 6 is a schematic diagram of a permanent magnet in Embodiment 2 of a wheel hub motor for an electric vehicle. A stator core consists of eight square-C-shaped sub stator cores, each sub stator core surrounds two sides of a disc brake and is fixed to a vehicle frame, and adjacent sub stator cores are different by 30 degrees in a circumferential direction. A permanent magnet is embedded in a yoke part at the middle portion of each sub stator core, and a magnetization direction of each permanent magnet is the same.

The working principle is as follows: the magnetic-conduction disc brake and the armature poles of the present invention are aligned, so, when a magnetic conductive portion of a saw blade is aligned with the armature pole, reluctance of an armature pole linkage is the minimum, and a flux linkage of the armature winding is the maximum; and when the sector-shaped through holes of the disc brake is aligned with the armature pole, the reluctance of the armature pole linkage is the maximum, and a flux linkage of the armature winding is the minimum.

When the magnetic conductive portion of the disc brake is gradually close to the armature pole, self inductance of the armature winding is increased; and when the magnetic conductive portion of the disc brake is separated from the armature pole, the self inductance of the armature winding is also reduced. Due to smart combination of the number of the sector-shaped through holes of the saw blade and the number of the armature poles, the armature winding of each sub stator core has its unique phase.

The self inductance of the armature winding of the motor of the present invention and the flux linkage of the armature winding linkage are continuously changed, so, if the exciting winding is powered on to provide an excitation magnetic field and a rotor core moves, the armature winding generates induced electromotive force. This is the principle of the motor of the present invention as recycled braking energy.

When the motor of the present invention runs as an electric motor, a phase of a winding generating a positive induced electromotive force is charged with a forward current such that the winding can generate a positive torque; and a phase of a winding generating a negative induced electromotive force is charged with the forward current such that the winding can generate a negative torque. Three-phase current is charged according to different phases such that the rotor can be driven to rotate.

What is claimed is:

1. A wheel hub motor for an electric vehicle, comprising a shaft, a hub, a stator core, armature windings, permanent magnets, a disc brake, a brake caliper and a bearing; wherein the disc brake fixed to the shaft is located on an inner side of the hub, eight sector-shaped through holes are uniformly distributed in the circumference of the disc brake, and a connection portion between two through holes is made of a magnetic conductive material;

the shaft is mounted on a vehicle frame through the bearing and can drive the hub to rotate;

the stator core consists of nine square-C-shaped sub stator cores, each sub stator core surrounds two sides of the disc brake and is fixed to the vehicle frame, and adjacent sub stator cores are different by 30 degrees in a circumferential direction;

a permanent magnet is fixed to a surface of an inner side of each sub stator core towards the disc brake, and a magnetization direction of each permanent magnet is the same; an end face of the permanent magnet is sector-shaped;

the sector-shaped end face of the permanent magnet and the sector-shaped through hole of the disc brake are aligned in a radial direction;

a concentrated armature winding is wound around a yoke part at the middle portion of each pair of the sub stator cores, and winding directions of all armature coils are the same; and the brake caliper is fixed to the vehicle frame and is located at a position without the stator core in a circumferential direction, friction plates on inner sides of the brake caliper are located on two sides of the disc brake, and the disc brake is also utilized as a rotor of the motor and a braking round disc.

2. The wheel hub motor for an electric vehicle according to claim 1, wherein the external diameter of a sector of the sector-shaped through hole of the disc brake is greater than the external diameter of a sector of the end face of the armature pole, and the internal diameter of the sector of the sector-shaped through hole of the disc brake is less than the internal diameter of the sector of the end face of the armature pole.

3. A wheel hub motor for an electric vehicle, comprising a shaft, a hub, a stator core, armature windings, permanent magnets, a disc brake, a brake caliper and a bearing; wherein the disc brake fixed to the shaft is located on an inner side of the hub, nine sector-shaped through holes are uniformly distributed in the circumference of the disc brake, and a connection portion between two through holes is made of a magnetic conductive material;

the shaft is mounted on a vehicle frame through the bearing and can drive the hub to rotate;

the stator core consists of eight square-C-shaped sub stator cores, each sub stator core surrounds two sides of the disc brake and is fixed to the vehicle frame, and adjacent sub stator cores are different by 30 degrees in a circumferential direction;

a permanent magnet is embedded in a yoke part at the middle portion of each sub stator core, and a magnetization direction of each permanent magnet is the same;

each sub stator core has a pair of armature poles extending towards an inner side, and one surface of each armature pole towards the disc brake is sector-shaped;

a concentrated armature winding is wound around a yoke part at the middle portion of each pair of the sub stator cores, and winding directions of all armature coils are the same; and the brake caliper is fixed to the vehicle frame and is located at a position without the stator core in a circumferential direction, friction plates on inner sides of the brake caliper are located on two sides of the disc brake, and the disc brake is also utilized as a rotor of the motor and a braking round disc.

\* \* \* \* \*